Patented Nov. 26, 1940

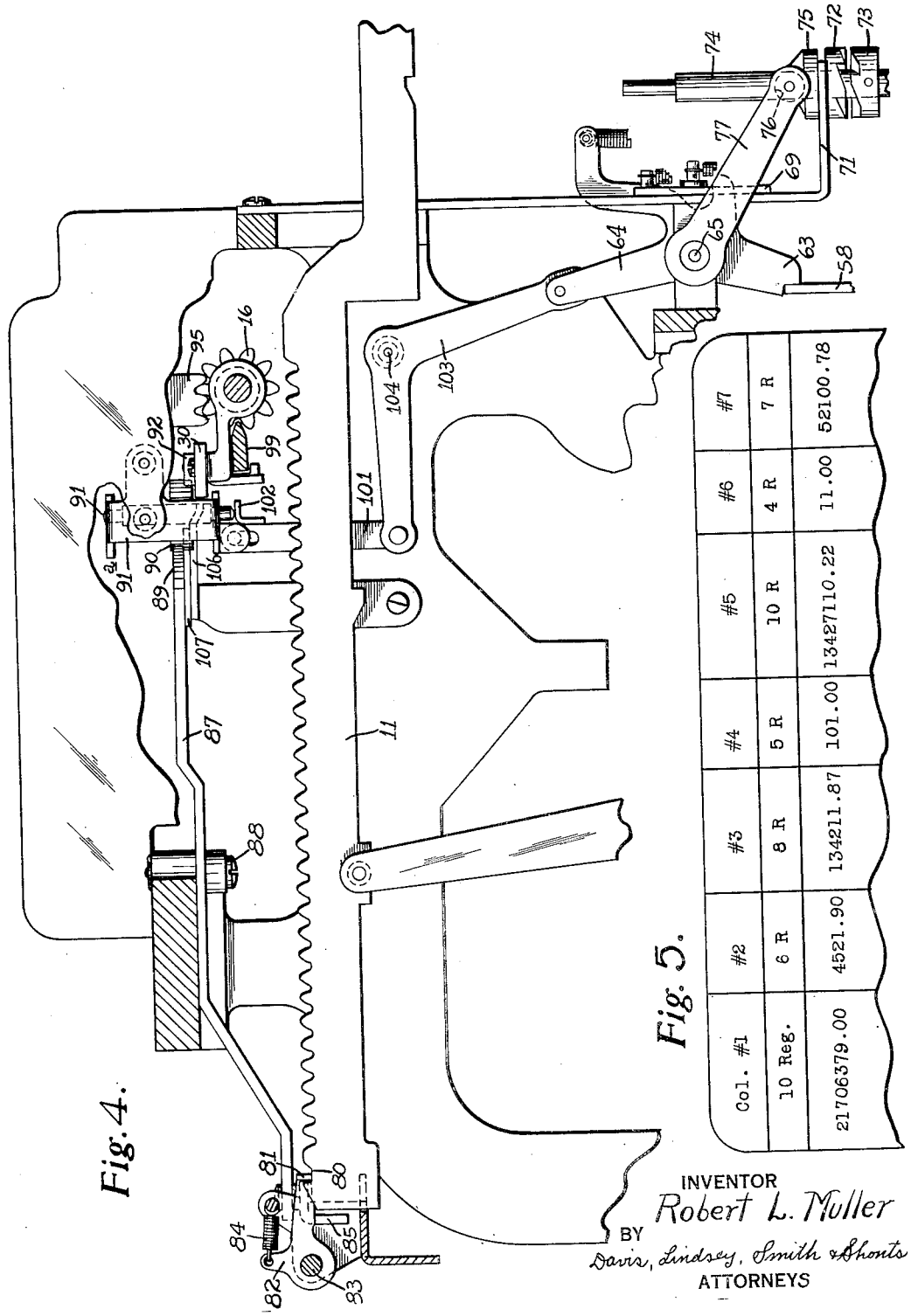

2,222,681

UNITED STATES PATENT OFFICE 2,222,681

CALCULATING MACHINE

Robert L. Muller, Detroit, Mich., assignor to Burroughs Adding Machine Company, Detroit, Mich., a corporation of Michigan Application October 31, 1936, Serial No. 108,606

6 Claims. (Cl. 235—60)

This invention relates to calculating machines and although it is particularly adaptable to calculating machines of the ten key type, it will be manifest that it is applicable to other types.

In many classes of work, it is necessary simultaneously to keep a plurality of widely differing accounts. This requires that the calculating machine used have a plurality of registers into which the accounts may be entered and accumulated and from which totals, varying greatly as to the number of digits contained therein, may be taken at predetermined intervals as desired.

Prior to the present invention it was necessary, because of the possible or occasional necessity to enter or accumulate large totals, to employ a machine having wholly independent registers of the proper number and capacity, or a machine having a series of register pinions divided into groups of register pinions. In the latter case each group had to have sufficient capacity to accumulate the maximum possible total or if each group did not have the maximum capacity it was necessary to take the total of the several register groups in predetermined sequence. Even then the number of digits contained in the totals could not exceed the orders or digits allotted to the column otherwise there would be an overlap into the next column when printing the total. This, of course, limited the number of groups of registers into which the total capacity of the machine could be divided or made the machine very unflexible.

The present invention is directed to a calculating machine in which a plurality of registers are provided, each of which is capable of carrying or accumulating only the desired amount or in which one or more registers are capable of being selectively split or divided into a plurality of groups of registers of varying capacities, each of which is capable of carrying or accumulating only to the desired amount.

It is an object of the present invention, therefore, to increase the flexibility and register capacity of a calculating machine.

It is a further object of the invention to increase the register capacity of a calculating machine without appreciably increasing the size, complexity or cost therefor and with a minimum number of alterations to a standard machine.

Other objects and advantages will be apparent from the following description of one embodiment of this invention given in connection with the drawings, in which:

Fig. 4 is a partial left side elevation partly in section illustrating a portion of the actuator rack controls; and Fig. 5 is a sample of work that may be performed on the machine embodying the present invention.

General calculating machine structure

Figure 1:
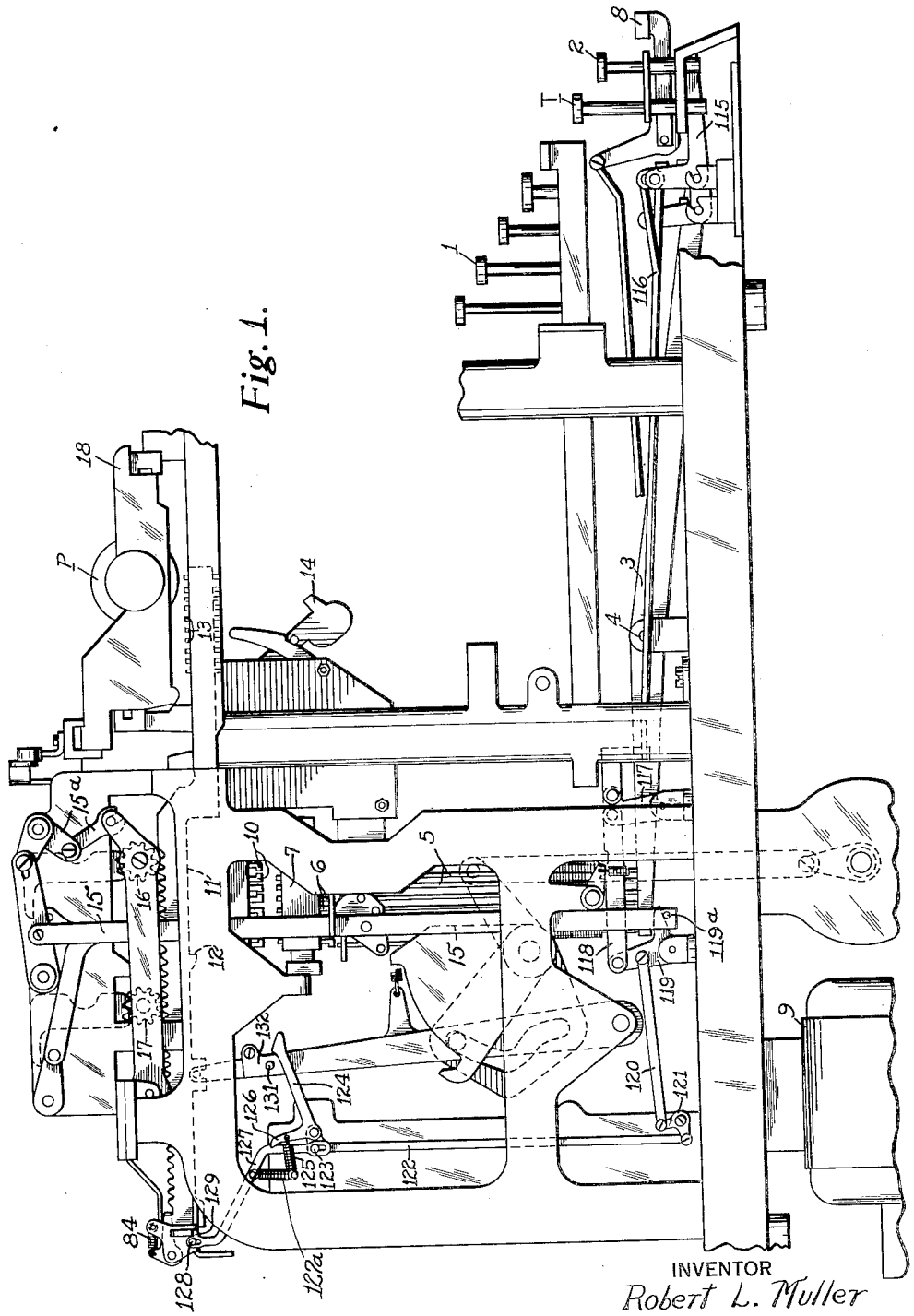
Figure 1 is a left side elevation of a machine with the casing removed and having the present invention embodied therein.

The invention is shown applied to a Burroughs Calculating Machine of the type shown in the Hopkins Patent No. 1,336,904, issued April 13, 1920. Machines of this type embody a typewriter mechanism as well as a calculating mechanism. The typewriter mechanism has not been illustrated in detail but is operated by suitable type keys 1 (Fig. 1), which operate the usual type bars (not shown) which imprint upon paper passed beneath a platen P.

The calculating mechanism is of the ten key type and includes ten digit or amount keys 2 representing digits from zero to nine, inclusive, and arranged in a lower or forward keyboard. The amount keys 2 control a differential mechanism including differentially movable racks and for this reason are connected to key levers 3 pivoted at 4 and having their rear ends positioned under vertically movable index bars 5, which, when raised by depression of keys 2, move pins 6 upwardly, in a movable pin carriage 7. The pins 6 are arranged in a plurality of rows, the different rows corresponding to the different orders of the machine, such as units, tens, hundreds, and so forth. The pin carriage is urged to the left, as viewed from the front of the machine, and its lateral movement is under the control of an escapement mechanism so that the pin carriage will move only one space to the left after each digit key has been depressed and released. The escapement mechanism is preferably of the type shown in the heretofore mentioned Hopkins patent or similar to that shown in the Thieme Patent No. 1,143,240.

After the pins have been set up in the pin carriage, the machine is given a cycle of operation by depression of the motor bar 8 which controls the driving or operating motor 9. During operation the pin carriage 7 is raised to bring its pins 6 into engagement with the vertically movable pins 10 in the stationary field of pins, which are thereby set up by the pins in the traveling pin carriage. The pins in the stationary field act as stops for a plurality of actuator racks 11 which have stop lugs 12 on them adapted to engage any of the pins 10 that may be projected into position. The actuator racks are normally held in rearward position, but during the forward stroke of operation of the machine are released to assume the forward position permitted by pins 10. The actuator racks 11 carry type 13 upon their forward ends and after the actuator racks have been differentially positioned, a printing mechanism including hammers 14 is operated to print the item that has been indexed or entered.

Front and rear registers 16 and 17, respectively, are provided and are moved into and out of engagement with the actuator racks 11 at appropriate times to perform calculating functions, such as addition, totaling, sub-totaling, transfer of totals and so forth. Mechanism for moving these registers into and out of engagement with the racks has not been illustrated in detail here but is disclosed in the heretofore mentioned Hopkins patent. This mechanism includes a link 15 which is connected to a toggle linkage 15ª for lowering the register frame in both accumulating and totaling operations as shown in the Hopkins Patents Nos. 1,336,904 and 1,206,113, although in the prior patents the link is connected directly to the register frame or through a cam. The mechanism also includes suitable controls to enable either the front or rear register, or both registers, to be engaged with the actuator racks during addition operations so that items may be added in either register or both registers simultaneously. These controls are well-known in the art and are shown in detail in the Hopkins patents and in the Thieme Patent No. 1,321,260.

The machine is provided with a traveling paper carriage 18 which supports the platen P. The carriage is tabulated across the machine from right to left, as viewed from the front, under control of a tabulating mechanism, such as disclosed in the Thieme Patent No. 1,259,929 and may be returned by power by mechanism such as disclosed in the Thieme Patent No. 1,120,862, the power in this case being the driving motor 9.

For more detailed description of the operation of this machine and the various mechanisms heretofore described, reference is made to the Hopkins and Thieme patents.

Multiple register assembly

The front register 16 in the illustrated embodiment contains fifty register pinions which are divided into seven sections or groups, $R_1$, $R_2$, $R_3$, $R_4$, $R_5$, $R_6$, $R_7$, of varying numbers of pinions as follows:

Register No. 1—10 pinions
2— 6 pinions
3— 8 pinions
4— 5 pinions
5—10 pinions
6— 4 pinions
7— 7 pinions
—
Total  7—50.

It will be understood that the fifty pinions may be divided into any other desired grouping. The register pinions are all mounted on a sleeve 19 (Fig. 2) slidable on common shaft 20 supported by arms 21 pivoted at 22 to the rear of the machine. The seven registers comprising the fifty pinions mounted on sleeve 19 are retained and moved along the common shaft 20 by a frame 23 secured to sleeve 19 and slidably supported on shaft 20. The entire register assembly consisting of the frame 23 and the seven registers is constantly urged to the left by a coil spring 27, one end of which is attached to the arm 21 and the other end of which is attached to the register frame 23. Controls are provided to position the register frame so that any one of the seven registers may be placed in active position relatively to the actuator racks, as will now be explained.

Multiple register control

Figure 2:
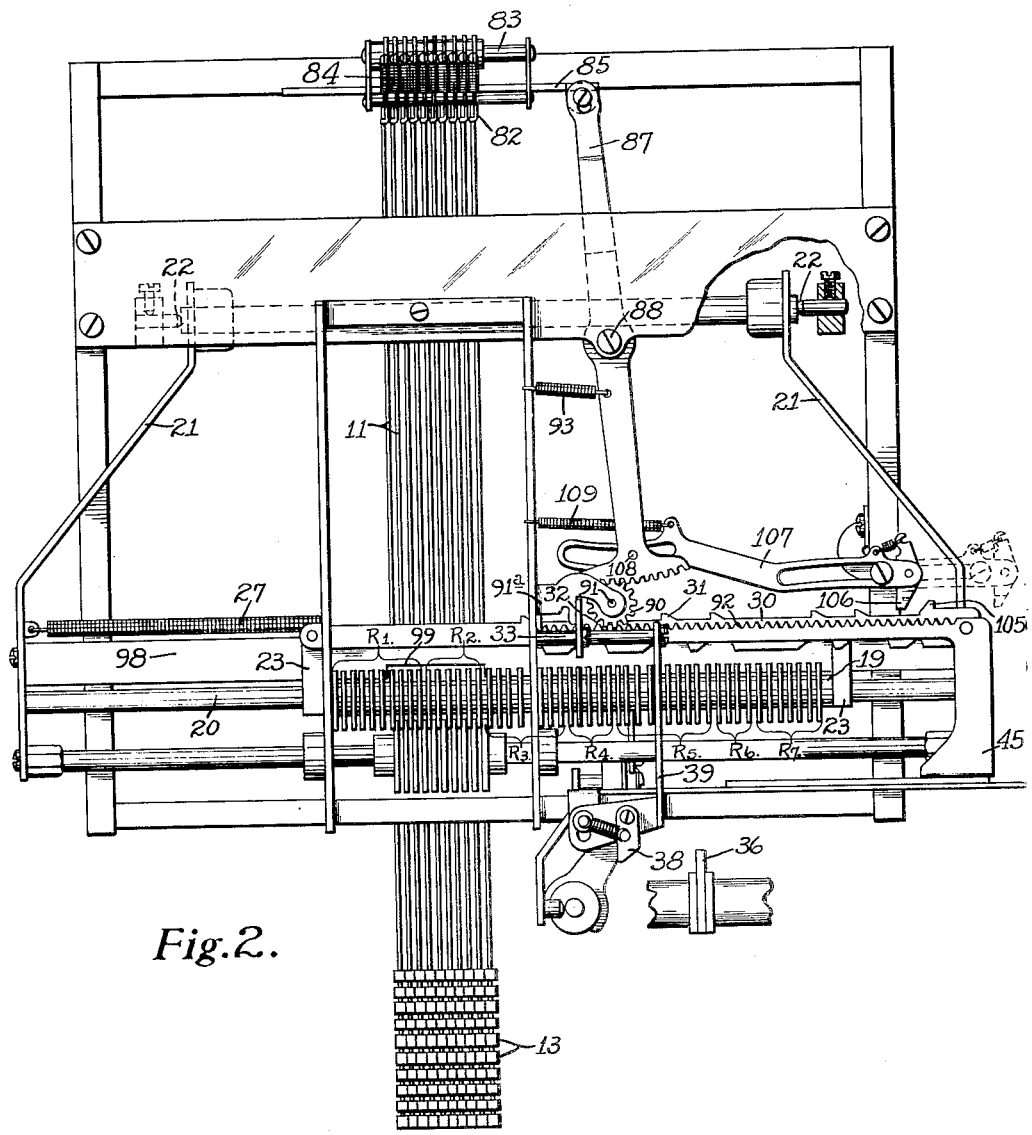
Fig. 2 is a fragmentary plan view illustrating the actuator racks and register controls.
Figure 3:
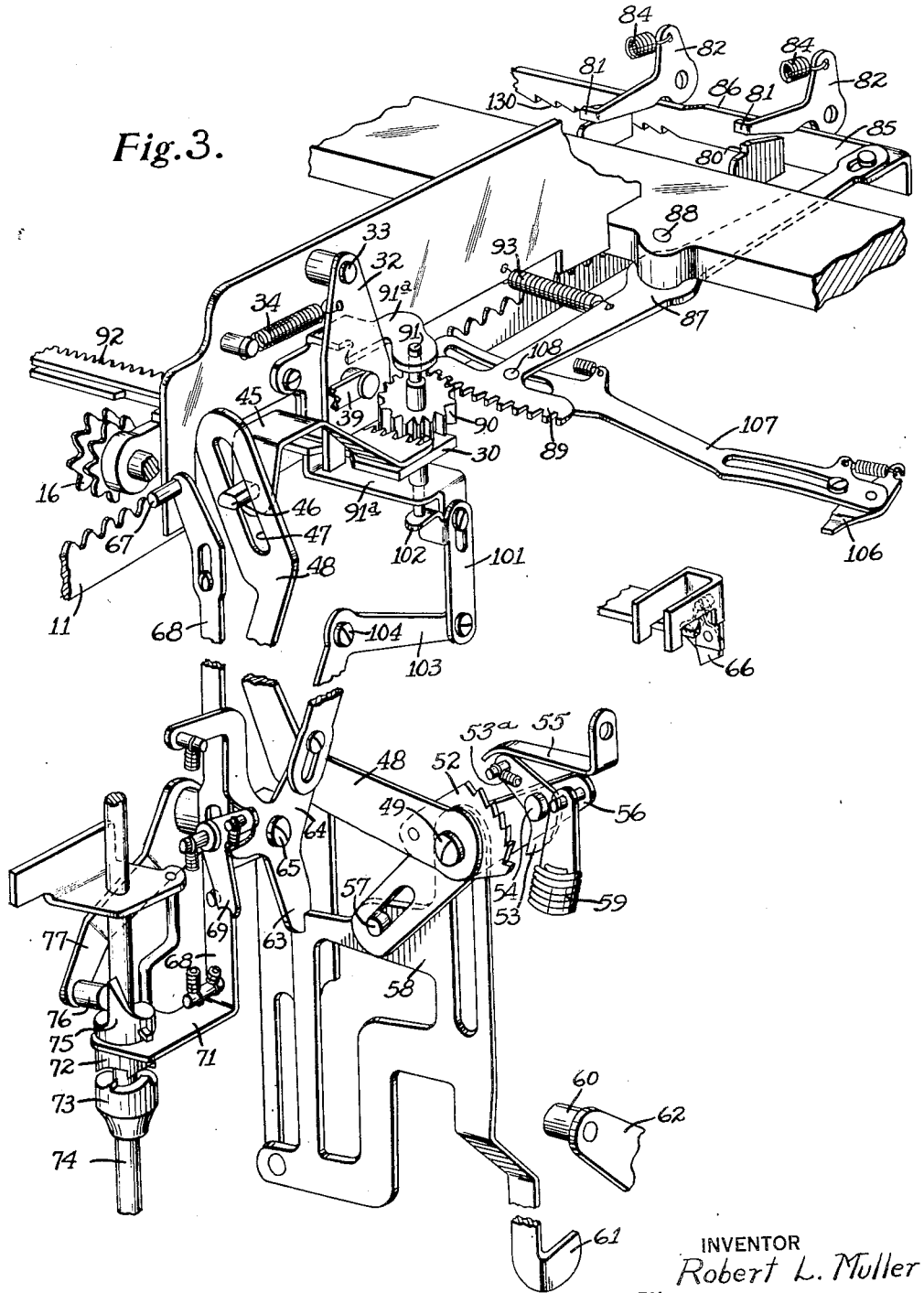
Fig. 3 is a fragmentary perspective view of the actuator racks and register controls.

Inasmuch as the seven registers in the frame are constantly urged to the left by spring 27, it is only necessary to release the register frame at certain intervals to permit movement thereof to the left and, to stop this movement of the register frame and registers therein at desired positions, to index a selected register in proper position to be brought into active relation with the actuator racks 11. For this purpose a stop bar 30 is attached to the register frame, which bar contains a number of lugs 31 which are engaged by a stop pawl 32 pivoted at 33 to the frame of the machine. Pawl 32 is urged in a clockwise direction by a spring 34 (Fig. 3) so that it engages lugs 31 to position the register frame with the selected register in proper active relation to the racks 11. In Fig. 2 the register frame is shown in position with the second register $R_2$ over the actuator racks 11. The arrangement is such that upon each complete oscillation of the pawl 32 the register frame is permitted to move a distance to the left equal to one register. Means are provided for controlling this movement of the register from the paper carriage.

Paper carriage control of register frame

The traveling paper carriage 18 is normally urged to the left as viewed from the front of the machine and is automatically tabulated into certain columnar positions so that figures may be printed in certain columns on a form or work sheet by mechanism described in the previously mentioned patents. As the carriage is tabulated into the various columnar positions, release dogs 36 (Fig. 2), adjustably secured to the carriage frame, engage a pass-by pawl 38 carried by an arm 39, which arm is connected to pawl 32. Therefore, as the paper carriage is tabulated into the columnar positions, dogs 36 contact pawl 38 to move arm 39, which, in turn, oscillates pawl 32 about its pivot to release the register frame and permit it to move a distance equal to one register to the left each time a carriage release dog 36 engages a pass-by pawl 38.

Restoring of registers

After the paper carriage has been tabulated to its full position to the left, as viewed from the front, and whether or not the register frame has been released and tabulated to its full left position, in which position register $R_7$ is in position over the actuator racks, the paper carriage can be returned automatically by motor power or manually. At this time, it may be desirable to return the register frame to its number 1 position or to some other selected position. This may be accomplished by mechanism not shown but similar to that shown in the Muller Patent No. 2,055,550 if partial restoration is desired in order that other entries may be printed on the paper form in a certain columnar position with a selected register in active position.

Any suitable register restoring mechanism may be employed, and I have illustrated a mechanism similar to that shown in my prior Patent No. 2,055,550, although in the present application no means is shown for partially restoring the register frame. The mechanism is preferably so arranged and adjusted that the register frame may be moved to the right sufficiently to permit R₁ register to contain less pinions than the total number of racks. In general, the restoring mechanism is as follows:

Register frame 23 is provided with a forwardly extending arm 45 having a stud 46 (Fig. 3) on its forward edge which engages in a slot 47 formed on the upper end of an arm 48 pivoted at 49 to the frame of the machine. Fixed to the pivoted end of arm 48 is a toothed sector 52 engaged under certain conditions by a pawl 53 pivoted at 54 to a lever 56 also pivoted at 49 to the frame of the machine and having at its other end a stud and slot connection 57 with a vertical slide 58. Lever 56 is urged clockwise (Fig. 3) by a tension spring 59, through which spring and connection 57, lever 56 tends to raise slide 58 when the latter is released. Slide 58 is periodically moved or restored downwardly against the action of spring 59 by a stud 60, which engages a lug 61 formed on the lower part of slide 58, and is carried by an arm 62 driven from the main shaft of the machine and is oscillated at each machine operation.

Slide 58 is normally latched in its lower position and against the action of spring 59 by one arm 63 of a latch 64 secured to a stub shaft 65. When the slide 58 and lever 56 are in the latched position of Fig. 3, the pawl 53 is held out of engagement with the toothed sector 52 by a fixed member 55 so that the arm 48 connected with the register frame may move freely with the register frame when the latter is released for movement by the spring 27.

*Paper carriage control of register restoration*

When the register frame is to be restored, a pass-by pawl 66 (Fig. 3) carried on the paper carriage engages a stud 67 on the upper end of a slide 68 which is thereby moved downward. This occurs preferably during the return movement of the traveling paper carriage but, with appropriate location and arrangement of the pawl 66 on the paper carriage, it can be caused to occur at the desired point in the travel of the paper carriage in either direction. The slide 68 is locked in its lower position by a pivoted latch member 69. The lower end of slide 68 has a lateral arm 71 which supports the upper member 72 of a clutch, the lower member 73 of which is fixed to a shaft 74. Shaft 74 is constantly rotated in a counterclockwise direction, as shown in the heretofore mentioned Thieme patents. Lowering of slide 68 will cause engagement of the two clutch members, causing the upper member to be driven in a counterclockwise direction. The upper member 72 of the clutch has an upstanding cam 75 which engages a stud 76 carried by an arm 77 secured to the stub shaft 65. Accordingly, upon rotation of the upper clutch member 72, latching arm 63, which is also secured to shaft 65, will be rocked to trip the latch 68 and simultaneously release slide 58, whereupon the lever 56 will be rocked clockwise and the slide 58 raised by spring 59. As the pawl 53 is carried away from the fixed member 55, it is rocked by its spring 53ª into engagement with the toothed sector 52, thereby coupling the lever 56 to the lever 48 which is then moved along with the lever 56 by the spring 59 to restore the register frame. When the latch 69 is tripped by the rocking of the latch 63, 64, the slide 68 is immediately returned upward by its spring and disengages the clutch member 72 from the clutch member 73. During the forward stroke of the next machine operation, slide 58, lever 56 and pawl 53 are restored to normal position by stud 60 on arm 62 engaging and lowering the lug 61. From the foregoing, it will be seen that the register frame is tabulated to the various register positions under control of the paper carriage and can be restored also under control of the paper carriage.

*Control of actuator racks*

As previously stated, this invention makes it possible to divide the register pinions into groups differing as to the number of pinions contained in each, thereby making it possible to divide the register pinions into groups each having only the necessary number of pinions for the particular account to be kept therein. This, in turn, makes it possible to divide the entire number of register pinions into more groups than would be the case if each group had to contain the greatest number of pinions required by any single register group.

At least some of the registers or groups of register pinions will have numbers of register pinions smaller than the number of actuator racks 11 in the machine. When such a register is selected for operation, particularly for a total-taking or a sub-total taking operation, those actuator racks 11 which do not cooperate with the pinions of the selected register should be held against operation. For example, in Fig. 2, register R₂ containing six pinions is in active relation with the actuator racks 11. Accordingly, only the six racks corresponding to the six pinions of the R₂ register should be released for movement during a machine operation and all racks above the sixth order should be blocked against movement. Of course, during a listing or adding operation, it would not be necessary to block the higher order racks if the operator did not enter in the machine an amount that exceeded the capacity of the selected register. However, during a totaling operation, the machine normally would cause all actuator racks to move forward to as far as required to zeroize the register pinions meshing with the respective racks and, if the machine were positioned as in Fig. 2 with the R₂ register in active position, and if all ten racks were released to move forward, the first four register pinions of the R₁ register would also be zeroized, which would, of course, be an incorrect operation. This would be true whether or not the printing mechanism for the higher orders was blocked. The present invention provides that each time a new register has been selected, the actuator racks are automatically controlled so that the correct number of racks, corresponding to the capacity of the selected register, are released and the remaining racks are blocked.

For this reason each actuator rack is provided at its rear end with a shoulder 80 (Figs. 3 and 4) which is normally engaged by a lug 81 of a latch 82 carried by a stationary shaft 83 (Figs. 2 and 4). It is understood that there is a latch for each actuator rack and the latches are spring urged counterclockwise into engagement with the actuator racks by springs 84. A laterally movable control member or slide 85 having an upper cam edge 86 underlies the latches 82 and upon lateral movement of the slide 85 its cam edge will function to release various groups of actuator racks, depending upon the position and contour of the slide. The upper cam edge 86 of the slide is so shaped that when the slide is moved all the way to the right (Fig. 3) its inactive position, all latches will be engaged with their corresponding racks and, accordingly, all actuator racks will be blocked against movement. The slide is so controlled that when each new register is selected for active engagement with the racks, the slide is repositioned and the upper edge is shaped to release the proper number of racks for differential movement.

Register frame control of actuator racks

The right end of slide 85 has a pin and slot connection with a lever 87 pivoted at 88 to the frame of the machine and terminating in a rack 89 which engages a pinion 90 secured to a vertical shaft 91 supported for vertical as well as rotary movement in brackets 91ª. The pinion 90 also meshes with a rack 92 carried by the register frame. Accordingly, the position of the register frame governs the position of slide 85 through rack 92, pinion 90, rack 89, and lever 87. Spring 93 secured to lever 87 normally urges the lever clockwise about its pivot and the slide 85 to its inactive or right position.

Each time a new register is selected the slide 85 is reindexed to release the proper number of actuator racks as follows:

When the machine is in normal or home position, the register pinions are out of engagement with the actuator racks 11 but in engagement with the carry or tens transfer segments 95. In amount entering operations, after the actuator racks have been moved forward to their indexed position, as determined by the amount keys depressed, the register frame is moved downward so as to engage the register pinions with the actuator racks 11. Then, as the machine is restored to normal position, the racks are moved to the rear and the register wheels are rotated the correct amount. Each time the register frame is moved downward, rack 92 is moved out of mesh with pinion 90 and spring 93 restores slide 85 to inactive position where latches 82 are in locking engagement with racks 11. This, however, does not take place until the end of the forward machine stroke and after the indexed racks have been positioned. At the extreme end of the return stroke, i. e., at the end of a machine operation, the register frame is again moved upward so that register pinions disengage from the actuator racks and re-engage the tens transfer racks and rack 92 re-engages pinion 90 with the slide 85 in inactive position.

At the end of the machine operation the paper carriage is automatically tabulated to the next columnar position, during which movement dog 36 engages pawl 38 to release the register frame for tabulating movement to position a different group of register pinions into active relation with the racks. During this movement or indexing of the register frame, rack 92 is in engagement with pinion 90 and repositions slide 85 to release the latches 82 associated with the actuator racks corresponding to the new indexed register pinions. It follows, therefore, that during each operation of the machine after the actuator racks have been indexed, the slide 85 is restored to inactive position where it remains until the tabulation of the paper carriage causes the register frame to move to the left to its new position, which movement reindexes slide 85 to release the proper number of actuator racks in accordance with the new indexed register. All register pinions not in alignment with the actuator racks 11 and transfer segments 95 are held against movement by a blade 98 (Fig. 2) which is carried by the register frame and has a cut out portion 99 overlying the actuator racks.

After the register frame has arrived in its last register position, it is restored by pawl 66 as previously described. As the register frame is restored to the right, pinion 90 is disengaged from rack 92 by being raised upwardly, which movement is permitted because of the permissible vertical movement of shaft 91. For this purpose a slide 101 (Fig. 3) is provided and is formed with a laterally extending lug 102 which engages the lower end of shaft 91. The lower end of slide 101 is connected to one arm of a bell crank 103 pivoted at 104. The other arm of bell crank 103 is connected to a second arm of latch 64. Accordingly, when latch 64 is rotated to release slide 58 to permit restoring of the register frame, bell crank 103 is also moved to raise shaft 91 and pinion 90 disengaging the latter from rack 92.

Control of racks after register restoration

When the register frame arrives in its normal position, it is necessary to release the correct number of actuator racks for the next machine operation. Since rack 92 controls slide 85 only in tabulating movements of the register frame, it is necessary to provide other means for positioning slide 85 after a complete restoration of the register frame. For this purpose stop bar 30 is provided with an additional lug 105 (Fig. 2), which engages a pass-by pawl 106 carried by one end of a sliding link 107, the other end of which has a pin and slot connection 108 with lever 87 and is normally urged to the left, as viewed in Fig. 2, by a tension spring 109. Link 107 is of proper length so that when lug 105 engages pawl 106 as the register frame reaches its restored position, link 107 will rock lever 87 about its pivot 88 and move slide 85 to the proper position to release the actuator racks associated with register $R_1$, although pinion 90 is held in raised position at this time by link 101 and is not restored until the following machine stroke, when link 101 is restored with latch 64.

When the machine is given its first stroke of operation after the register frame has been restored to its right position with register $R_1$ in active relation to the actuator racks and the register frame is moved downward, lug 105 is moved downward out of engagement with pawl 106, permitting link 107 to move to the left, which permits restoration of lever 87 and slide 85 to normal inactive position. During this portion of the machine operation, link 101 is restored and pinion 90 reengages rack 92 so that as the carriage is tabulated to the next columnar position at the end of the machine operation, the register frame again assumes control of slide 85 through rack 92 to release the proper number of actuator racks corresponding to the number of pinions in the next register $R_2$ moved into actuation with the actuator racks. From this it follows that sliding link 107 positions slide 85 and selects the actuator racks to be released for the first operation after the complete restoration of the register frame, and that the selection is thereafter made from the register frame through rack 92 for all succeeding machine operations while the register frame is being tabulated to the left.

Total taking

In total taking the register pinions are moved immediately into engagement with the actuator racks instead of at the end of the forward stroke of the machine. Lowering of the register frame ordinarily causes a release of the slide 85 permitting it to return to inactive position. To prevent this early release before the proper number of actuator racks are released in accordance with the register pinions being totalized, a means is provided which, when the total key is depressed, locks slide 85 in position until after the correct number of actuator racks have been released for the total taking operation. For this purpose a crank 115 is disposed beneath the total key so as to be rocked thereby, which crank upon being depressed pulls a rod 116 forward. The rear end of rod 116 is connected to a crank 117 which is also connected to a link 118 attached to a crank 119. The latter crank controls engagement of the registers with the racks during total taking operations by lowering link 15 by engaging a stud 119a therein, as disclosed in the heretofore mentioned Hopkins patents. Crank 119 is also connected by a link 120 to one arm of a crank 121 the other arm of which is connected to a vertical slide 122. The upper end of slide 122 has a slotted guiding connection with a stationary stud 123 and has pivoted thereto a crank 124 urged counterclockwise by spring 125 until the upper end of arm 126 thereof engages in a notch in a link 127 mounted for vertical sliding movement upon stud 123 and another stud 128. Link 127 is formed with a projection 129 which, when the link is in raised position, engages in notches 130 (Fig. 3) formed on the under edge of slide 85. It follows from the foregoing that depression of total key T into the connections just described raises link 127 so that its lug 129 engages in a notch 130 and retains slide 85 in its indexed position, thereby preventing movement of the slide when the register pinions are moved into engagement with the actuator racks for totaling operation. Accordingly, the control slide 85 is locked in any position to which it has been moved under control of the register frame and permits the correct number of actuator racks to be released, depending upon the number of pinions in the active register.

During the early part of the totaling operation, a stud 131 carried by a lever 132, for moving the racks, is moved forward and engages a forwardly projecting arm of crank 124 and releases it from link 127 allowing link 127 to be moved downward by its spring 127a and release slide 85. This permits slide 85 to be restored to inactive position. Restoration of slide 85 at this time does not interfere with the machine operation because the correct number of actuator racks has already been released for the total taking operation.

It is not believed necessary, in view of the foregoing description, to repeat the manner and mode of operation of the machine inasmuch as it has been given in describing the various sections of the machine.

It follows from the foregoing description that by controlling the racks through the register frame, which is in turn controlled by the paper carriage and by controlling the racks in totaling operations through the medium of the total key, variable groups of racks may be released for operation in accordance with the number of pinions in the selected register, which register is also selected by means of the paper carriage in the illustrated machine. In this manner, a given total number of register pinions may be divided into more groups or sections, each of which comprises a complete register, than if each group had to contain the same number of register pinions as that group of pinions in which the largest totals are to be accumulated. The foregoing construction permits the totals of each register to be printed upon the same line without overlapping of the printed totals as long as the columnar widths of the paper are chosen to accommodate the maximum number of orders in the particular register used in that column.

It will be obvious to those skilled in the art that the principles of this invention may be employed in calculating machines of other types than the specific ten key type machine illustrated, and that various changes may be made in the details of the construction shown without departing from the spirit and scope of this invention as set forth in the claims appended hereto.

I claim:

1. In a calculating machine, a plurality of manipulative amount determining keys, differentially movable actuator racks, means for controlling said racks from said keys, a movable register support, a plurality of register pinions therein divisible into groups of variable numbers of pinions, means for moving said register support in one direction, means for restoring said register support in the other direction, means for moving said racks and register pinions relative to each other to render any one of a selected group of register pinions active with respect to said racks for both amount entering and total taking operations, latches for restricting movement of said racks, an adjustable slide for releasing said latches in groups varying in number of racks, means automatically operable under control of said support when moving in one direction for controlling movement of said slide, and additional means for controlling movement of said slide upon restoration of said register support.

2. In a calculating machine, a plurality of manipulative amount determining keys, differentially movable actuator racks, means for controlling said racks from said keys, a movable register support, a plurality of register pinions therein divisible into groups of variable numbers of pinions, means for moving said register support in one direction, means for restoring said register support in the other direction, means for moving said racks and register pinions relative to each other to render any one of a selected group of register pinions active with respect to said racks for both amount entering and total taking operations, latches for restricting movement of said racks, an adjustable slide for releasing said latches in groups varying in number of racks, means automatically operable under control of said support when moving in one direction for controlling movement of said slide, and additional means controlled by said register support for positioning said slide upon restoration of said register support.

3. In a calculating machine, a plurality of manipulative amount determining keys, differentially movable actuator racks, means for controlling said racks from said keys, a movable register support, a plurality of register pinions therein divisible into groups of variable numbers of pinions, means for moving said racks and register pinions relative to each other selectively to render any one of said groups of register pinions active with respect to said racks for amount entering and total taking operations, a slide movable from normal position to control said racks in groups varying in number of racks in accordance with the position of said slide, means for returning said slide to normal position at each machine operation, and means operable in accordance with the position of said register support for controlling movement of said slide at each machine operation to control predetermined racks in accordance with the number of pinions in the selected group of register pinions in active position during both amount entering and total taking operations.

4. In a calculating machine, a plurality of manipulative amount determining keys, differentially movable racks, means for controlling said racks from said keys, a traveling paper carriage, a registering mechanism having a plurality of pinions divisible into groups having variable numbers of pinions and mounted in a movable support, means controlled by said carriage for moving said support and register pinions relatively to the racks selectively to render any one of said groups of register pinions active relatively to said racks for both amount entering and total taking operations, a movable member, means operable thereby for controlling the movement of variable groups of racks in both amount entering and total taking operations, and means moved by said register support for effecting movement of said member.

5. In a calculating machine, a plurality of manipulative amount determining keys, differentially movable actuator racks, means for controlling said actuator racks from said keys, a registering mechanism having a plurality of pinions divisible into groups of variable numbers of pinions, means for moving said racks and register pinions relative to each other selectively to render any one of said groups of register pinions active relatively to said racks for amount entering and total taking operations, a total taking control key, an adjustable member, means associated with said member for controlling the movement of variable groups of racks, means for moving said member in accordance with the selected active group of register pinions, and means controlled by said total taking key for locking said member in adjusted position for a total taking operation.

6. In a calculating machine, a plurality of manipulative amount determining keys, differentially movable actuator racks, means for controlling said racks from said keys, a registering mechanism having a plurality of pinions divisible into groups of variable numbers of pinions, means for moving said racks and register pinions relative to each other selectively to render any one of said groups of register pinions active relatively to said racks for both amount entering and total taking operations, latches for restricting movement of said racks in both amount entering and total taking operations, a total taking control key, an adjustable slide having means thereon for releasing said latches to control movement of variable groups of racks in both amount entering and total taking operations, and means controlled by said total taking key for locking said slide in position for a total taking operation.

ROBERT L. MULLER.